Dec. 2, 1952　　　R. R. TREXLER　　　2,619,849
CHANGE SPEED MECHANISM
Filed Oct. 11, 1943　　　　　6 Sheets-Sheet 3

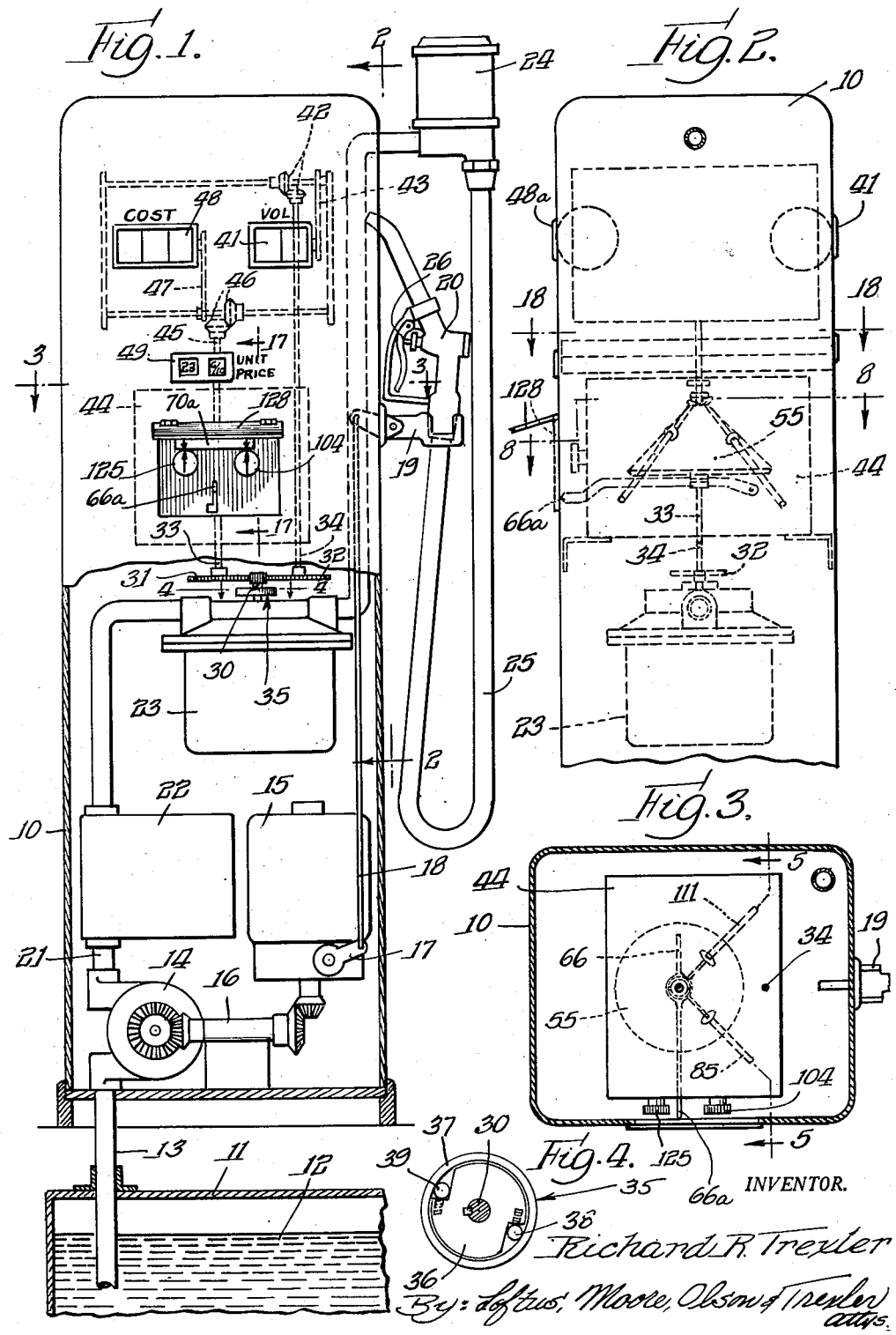

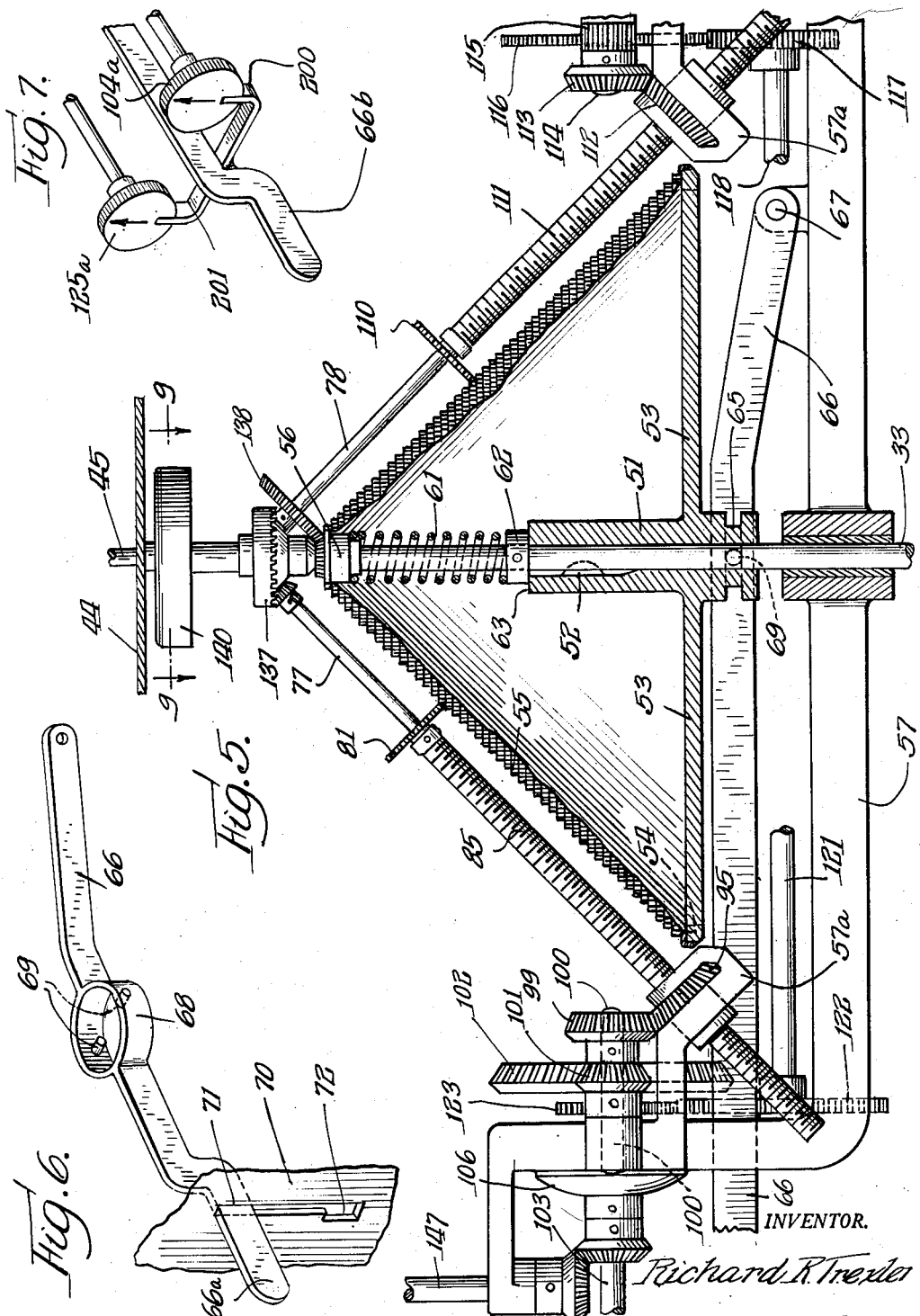

INVENTOR.
Richard R. Trexler
BY Loftus, Moore
Olson & Trexler
attys.

Dec. 2, 1952 R. R. TREXLER 2,619,849
CHANGE SPEED MECHANISM
Filed Oct. 11, 1943 6 Sheets-Sheet 4

INVENTOR.
Richard R. Trexler
By: Loftus, Moore, Olson & Trexler
attys

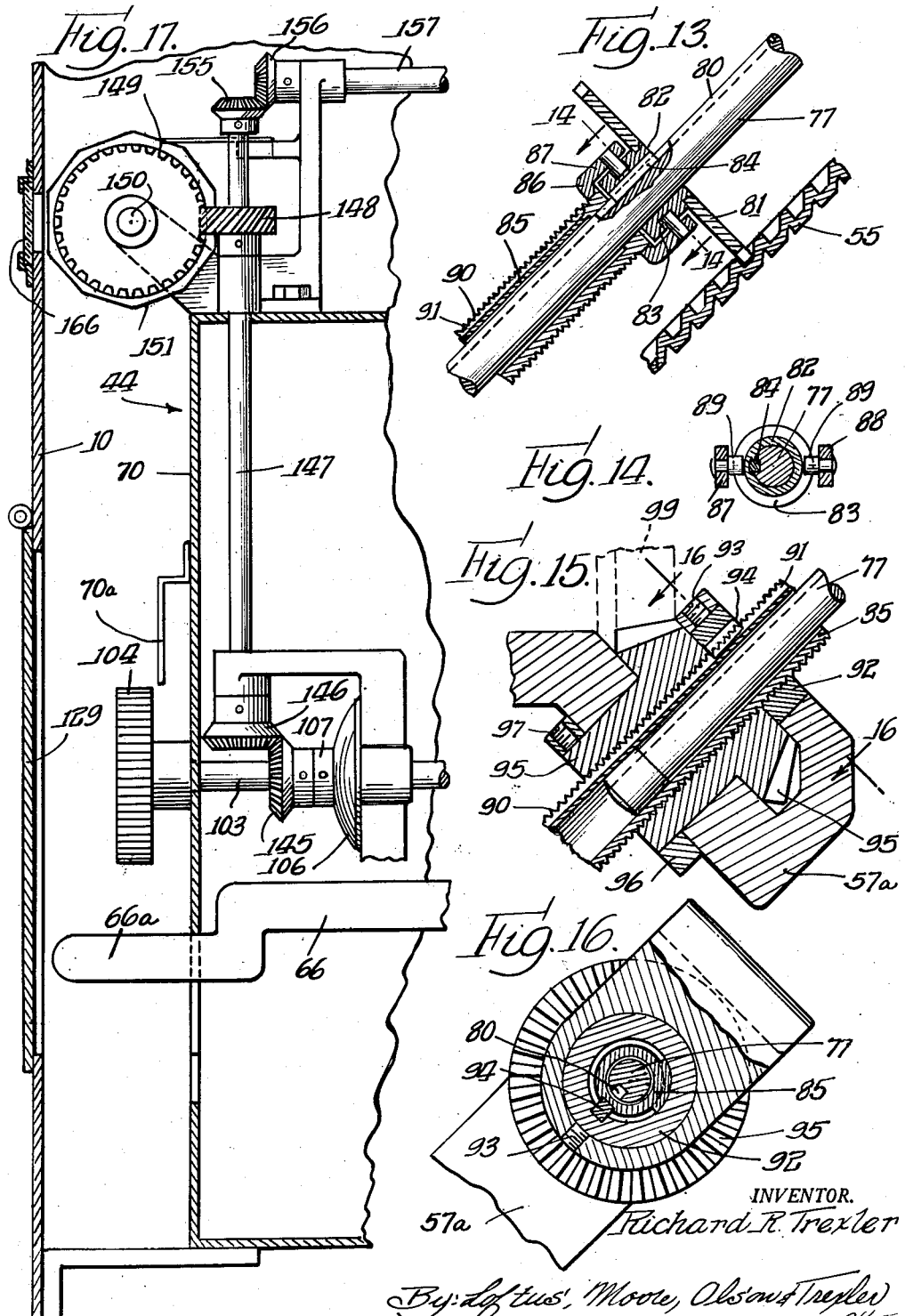

Dec. 2, 1952 R. R. TREXLER 2,619,849
CHANGE SPEED MECHANISM
Filed Oct. 11, 1943 6 Sheets-Sheet 6
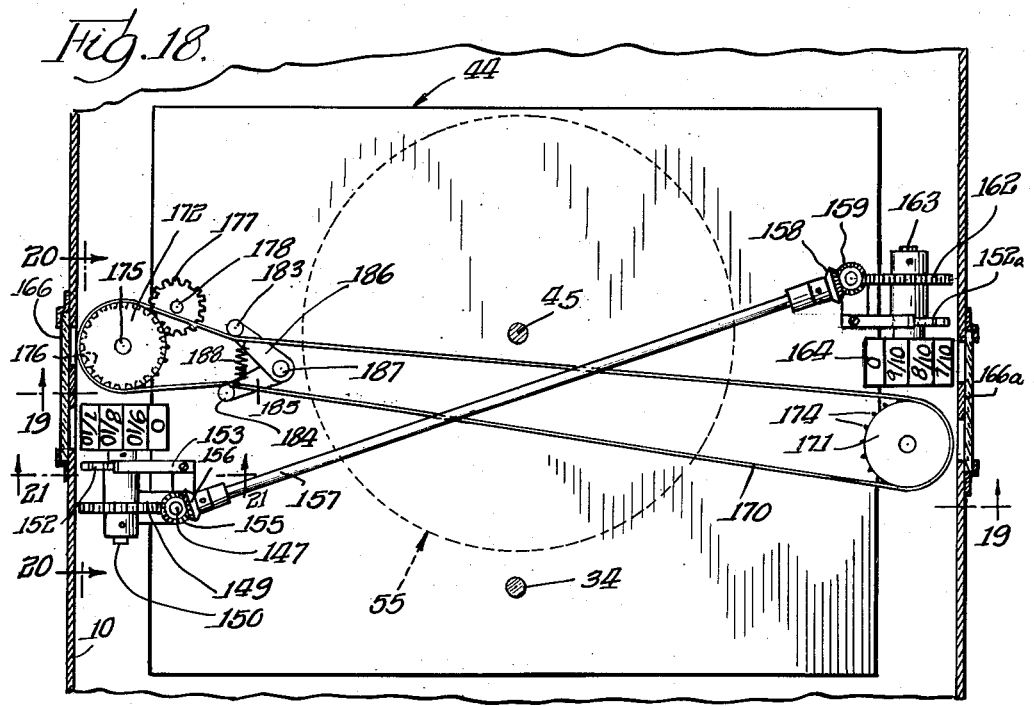
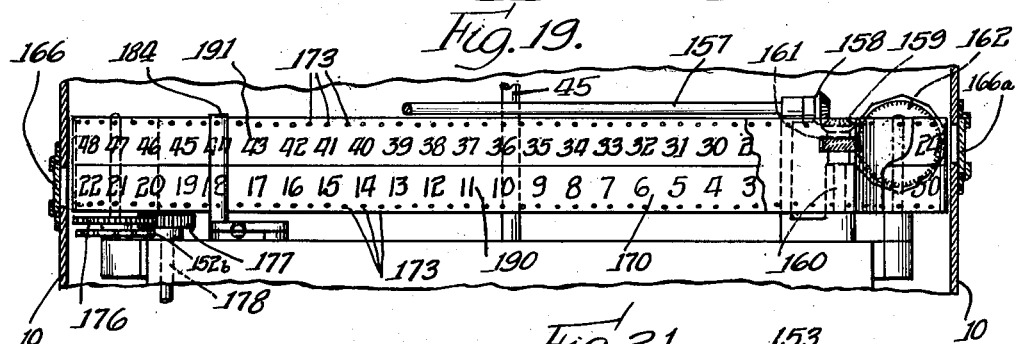
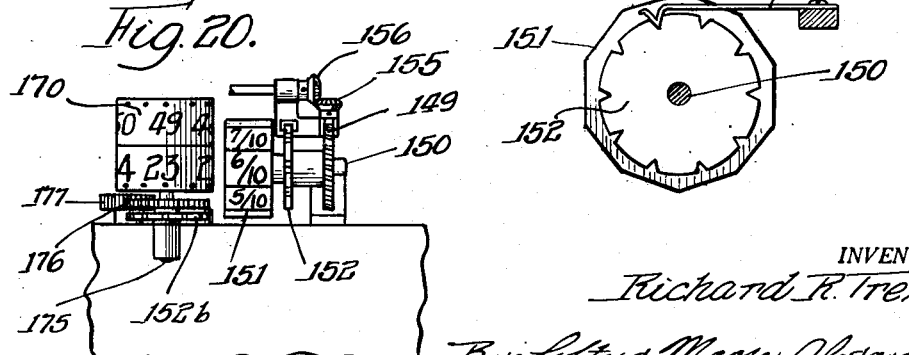
INVENTOR.
Richard R. Trexler
By: Loftus, Moore, Olson & Trexler
Attys.

Patented Dec. 2, 1952

2,619,849

UNITED STATES PATENT OFFICE 2,619,849

CHANGE SPEED MECHANISM

Richard R. Trexler, Evanston, Ill.

Application October 11, 1943, Serial No. 505,814

17 Claims. (Cl. 74—681)

1

This invention relates to computing and registering mechanisms, and particularly to such mechanisms as adapted for use with commodity dispensing apparatus.

It is an object of the invention to provide a computing and registering mechanism of the type defined which is of simplified construction and improved operating characteristics.

More specifically stated, one of the objects of the invention is to provide an improved and simplified variator or change speed gearing structure in a mechanism of the type defined.

Another object of the invention is to provide improved means for adjusting the variator or change speed mechanism, whereby calculations and computations may be made at different selected values and ratios.

Still another object of the invention is to provide an improved indicator structure in a mechanism of the type defined.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a dispensing apparatus, specifically for dispensing liquids such as gasoline or the like, including a computing and registering mechanism constructed in accordance with and embodying the principles of the invention;

Fig. 2 is a partial vertical sectional view of the apparatus of Fig. 1, taken as indicated by the line 2—2 thereof;

Fig. 3 is a transverse sectional view through the apparatus, taken as indicated by the line 3—3 of Fig. 1;

Fig. 4 is a detail view, on an enlarged scale, of a ball clutch structure forming a part of the mechanism, and taken as indicated by the line 4—4 of Fig. 1;

Fig. 5 is a sectional view through the apparatus, on an enlarged scale, and taken along the irregular section line 5—5 of Fig. 3;

Fig. 6 is a detail perspective view of the cone depressing or disengaging lever, and associated parts;

Fig. 7 illustrates a cone depressing lever arrangement of modified form;

Fig. 13 is a detail sectional view on the line 13—13 of Fig. 8, illustrating a part of the drive gearing driven by the cone;

Fig. 14 is a transverse sectional view through the mechanism of Fig. 13, on the line 14—14 thereof;

Fig. 15 is a detailed sectional view of a part of the adjustment mechanism for the cone driven gearing, and taken as indicated by the line 15—15 of Fig. 8;

Fig. 16 is a transverse sectional view through the mechanism of Fig. 15 on the line 16—16 thereof;

Fig. 17 is a detail view of a part of the indicator and variator adjustment structure, taken as indicated by the line 17—17 of Fig. 1;

Fig. 18 is a horizontal sectional view of the indicator structure taken as indicated by the line 18—18 of Fig. 2;

Fig. 19 is a vertical sectional view of the indicator structure on the line 19—19 of Fig. 18;

Fig. 20 is a detailed front or face view of one set of indicators, taken as indicated by the line 20—20 of Fig. 18; and Fig. 21 is a detail view of one of the detent positioning mechanisms associated with the indicators, and taken as indicated by the line 21—21 of Fig. 18.

Figure 8:
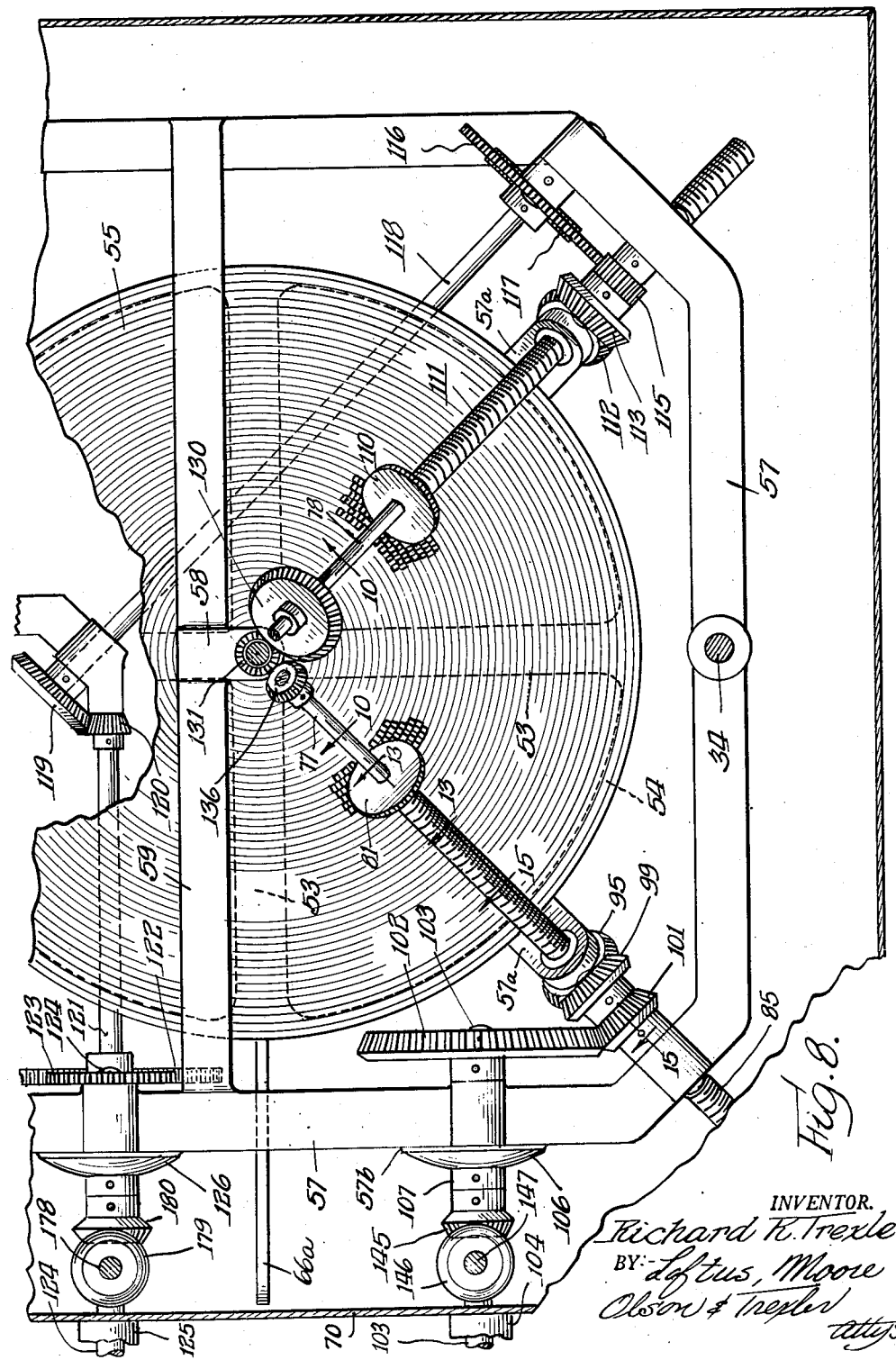
Fig. 8 is a horizontal sectional view through the apparatus, on the scale of Fig. 5, and taken as indicated by the line 8—8 of Fig. 2.

In the drawings, the invention has been illustrated as applied to a liquid dispensing apparatus, such as for gasoline or the like, as certain features and principles of the invention are particularly adapted for use on apparatus of this character. It is to be understood, however, that various aspects of the invention are also of general utility and may be utilized with computing and registering mechanisms associated with other types of apparatus, including dispensing apparatus for other kinds of commodities.

Referring more specifically to the drawings, in Fig. 1 a dispensing apparatus for gasoline or the like is illustrated comprising an upstanding housing 10 adapted to be associated with an underground storage tank 11 containing a supply of the liquid to be dispensed, as indicated by the numeral 12. A pipe 13 leads from the underground tank to a pump 14 forming a part of the dispensing apparatus. As shown, the pump is adapted to be driven from an electric motor 15 by means of a drive shaft 16 and associated bevel gearing connections. A switch 17 is provided for controlling the energization of the electric motor, which switch is adapted to be actuated from a rod 18 connected to the support hook 19 for the dispensing nozzle 20.

The pump 14 is adapted to propel the dispensed gasoline through the outlet dispensing line 21, which includes an air eliminator 22, a meter or measuring device 23, a sight gauge 24, and a flexible dispensing hose 25, the end of which carries the nozzle 20. In operation, as the nozzle 20 is removed from its support 19 and the electric motor energized, the pump 14 will operate to propel the gasoline through the dispensing line upon the opening of the usual nozzle valve 26 associated with the dispensing nozzle. The foregoing structure may be of any suitable type and forms no part of the present invention except insofar as it enters into the general combination.

In accordance with the present invention, the meter shaft 30, which is driven in proportion to the volume of liquid dispensed, drives a pair of gears 31 and 32 associated respectively with a variator drive shaft 33 and a volume register drive shaft 34. A ball clutch structure 35 may be associated with the meter shaft to prevent the reverse rotation thereof. Such ball clutch may be of conventional construction, and as illustrated in Fig. 4, comprises a disc 36 fixed to the meter shaft 30 and rotatable within a stationary frame housing 37. Spring pressed clutch balls 38 and 39 are provided for preventing reverse rotation of the disc 36 and the meter shaft, as will be understood.

The volume register drive shaft 34 extends upwardly to suitable register mechanism, as indicated in Fig. 1. As indicated, the shaft 34 drives the volume register 41 by suitable means such as bevel gearing 42 and a chain drive 43.

The variator drive shaft 33 is adapted to drive computing mechanism disposed within a casing, as indicated at 44 in Fig. 1, the details of which will be later described. The output drive shaft 45 from this computing mechanism is adapted by suitable means, such as bevel gearing 46 and a chain drive 47, to operate a cost register 48. It is contemplated that the computing mechanism within the casing 44 shall be settable and variable in accordance with the unit cost of the gasoline dispensed. Accordingly, it will be seen that the cost register 48 will indicate the total cost of the dispensed gasoline, whereas the volume register 41 will indicate the corresponding volume thereof. A unit price indicator 49 is associated with the computing mechanism in the casing 44, for indicating the unit price or setting of the variator.

As best shown in Fig. 2, it is contemplated that the volume and cost registers may be duplicated upon opposite faces of the housing. These registers may be of any suitable construction, including suitable transfer mechanism, reset mechanism, etc. The details of the registers 41 and 48, and the specific manner in which they are driven from their drive shafts 34 and 45 form no part of the present invention, except insofar as they enter into the combination shown.

Referring more specifically to Fig. 5, it will be seen that the variator drive shaft 33 is adapted to drive a sleeve fitting 51, the fitting being constrained for rotation with the shaft 33, but being adapted for vertical shifting with respect to the shaft by means of a key and slot connection, as indicated at 52. As best shown in Figs. 5 and 8, the fitting 51 is provided with a plurality of radially extending spokes 53, on the end of which a ring member 54 is formed. A sheet metal cone 55 is secured at its lower end, as by welding, to the ring 54, the upper end of the sheet metal cone being shaped, as best shown at 56 in Fig. 10, for bearing engagement upon the shaft 33. The drive shaft 33 has bearing engagement at its lower end with a frame member 57, Fig. 5, forming a part of the casing 44, and at its upper end with a bearing member 58, Figs. 8 and 10, carried by a cross brace 59, also formed as part of the frame and casing structure.

A compression spring 61 bears at its upper end against the formed bearing portion 56 of the sheet metal cone and at its lower end against a collar 62 secured to the drive shaft 33. This compression spring normally urges the fitting 51 and its attached cone member 55 upwardly into the position shown in Figs. 5 and 10, the upper end 63 of the fitting being in bearing engagement against the collar 62. Means is provided, however, for shifting the cone and fitting slightly downwardly with respect to the shaft 33, and against the action of the spring 61, for the purpose of disengaging the cone from the gears driven thereby, for a purpose later to be more specifically described.

To effect this shifting, the fitting 51 is provided at its lower portion with an annular channel 65, Fig. 5. A shifting or disengaging lever 66 is pivoted, as indicated at 67, to the frame 57, the end of the lever extending outwardly, as best indicated in Fig. 6, to provide a handle portion 66a. The lever 66 is provided with a central ring like portion 68 having a pair of inwardly projecting pins 69, which pins are engageable with the annular groove or channel 65 in the fitting 51. It will be seen that as the handle 66a is manually depressed or pushed downwardly, the fitting 51 and associated cone 55 will be correspondingly depressed a given distance. As also indicated in Fig. 6, the front plate member 70, forming a part of the casing 44, is provided with a slot 71, the lower end of which is widened, as indicated at 72, whereby the handle 66a may be slightly shifted laterally after being depressed to lock the cone downwardly against the action of the compression spring 61.

The cone member 55 is provided with a series of coaxial rows of indentations 75, forming gear teeth, there being forty-seven rows of such indentations or gear teeth in the particular embodiment shown. The smallest and largest rows bear the gear ratio of 4 to 50, and the intermediate rows are of uniform progressively increasing size or gear ratios. In the particular embodiment shown, the smallest row of indentations on the cone provides sixteen teeth and the largest row two hundred teeth.

A pair of cone driven shafts 77 and 78 are mounted for rotation in juxtaposition to the cone, the shafts being disposed parallel with the working surface of the cone. In accordance with the invention, and as shown, the cone working surface and the shafts 77 and 78 are disposed at an angle of 45° with respect to the shaft 33. In horizontal projection, the shafts are disposed relative to each other at an angle of 90°, as best shown in Figs. 3 and 8. The shafts are supported for rotation at their lower ends by means of a pair of frame brackets 57a, Fig. 5, forming a part of the frame structure 57, and at their upper ends by a bracket 58a, Fig. 10, forming a part of the frame bracket 58. Shaft 78 is adapted to effect the cent calculations, whereas shaft 77 is adapted to effect the tenths of cents calculations, as will later more specifically appear.

As best shown in Figs. 13 and 14, shaft 77 is provided with a slot or spline 80 extending along its length whereby the shaft supports a cone engaging gear 81, said gear being adapted to drive the shaft 77, but being slidable longitudinally thereof. Means is provided for positioning the gear 81 longitudinally of the shaft. For this purpose, the gear 81 has a hub 82 fixed thereto, which hub is provided with an annular channel or groove as indicated at 83. The hub is also provided with a key portion 84 adapted for slidable engagement within the shaft spline notch 80. A threaded sleeve 85 loosely embraces the shaft 77, this sleeve having fixed on its upper end a fitting member 86 provided with a pair of ears 87 and 88, having pins 89 projected into the annular hub groove 83. It will be seen that by reason of the connection provided, movements imparted to the threaded sleeve 85, longitudinally of the shaft 77, are correspondingly transmitted to the gear 81 to effect the longitudinal positioning thereof. At the same time the gear 81 and shaft 77 are rotatable as a unit while the sleeve 85 remains non-rotatable or fixed.

The means for effecting the longitudinal positioning of the threaded sleeve 85, to thereby effect the longitudinal positioning of the gear 81, are best shown in Figs. 5, 8, 15 and 16. The sleeve 85, which is provided with a screw thread as indicated at 90, extending substantially along its entire length, is also provided with a longitudinally extending spline or notch 91. A collar 92, fixed to the frame bracket 57a by means of a set screw 93, is provided with a projection 94 extending into the sleeve notch 91, whereby to prevent rotation of the sleeve in all of its longitudinally adjusted positions. A nut gear 95 has threaded engagement with the screw thread 90 of the sleeve, said gear being rotatable within the frame bracket 57a, and held against longitudinal movement with respect to the frame by means of a collar 96 fixed to the nut gear by a set screw 97. The lower end of the shaft 77 is rotatably supported by the sleeve 85 and the nut gear, as shown.

To effect its operation, the rotatable nut gear 95 is in engagement with a bevel gear 99, Figs. 5 and 8, fixed to a bracket journaled stub shaft 100, which stub shaft also has fixed to it a bevel gear 101 having meshing engagement with a bevel gear 102 fixed on the end of an adjustment shaft 103. Shaft 103, which is also journaled in a portion of the frame 57, extends through the frame and through the casing face plate 70, and has fixed on its forward end a manually operable adjustment knob 104, as best shown in Fig. 17. It will be seen that by reason of the connections thus provided, as the knob or handle 104 is manually rotated, proportional increments of rotation will be imparted to the nut gear 95 through the gearing 99, 101, 102, and rotation of the nut gear in turn imparts longitudinal increments of movement to the non-rotatable sleeve 85 by means of the threaded connection between the sleeve and the nut gear.

A spring braking disc 106, Fig. 8, is mounted on the shaft 103, and bears between a collar 107 pinned to the shaft and a face surface 57b on the frame 57, whereby a predetermined frictional resistance to movement is imparted to the shaft 103 and the associated adjustment knob and connected gearing, at all times. The shaft 103 is thus maintained in the position to which it is moved by manipulation of the knob 104.

The cents shaft 78 carries a gear 110, Figs. 5 and 8, engageable with the cone 55 and adapted to be driven thereby, said gear being splined to the shaft 78 so as to be rotatable therewith but longitudinally shiftable therealong by means of a connection similar to the connection between the gear 81 and the shaft 77. A threaded sleeve 111 is provided for longitudinally positioning the gear 110, the connection between the sleeve and gear being similar to that previously described between the sleeve 85 and the gear 81. The longitudinal positioning of the nonrotatable sleeve 111 is effected by means of a nut gear 112, which gear is associated with the sleeve in the manner previously described in reference to the nut gear 95. Gear 112 meshes with and is driven by a bevel gear 113 fixed to a stub shaft 114, which stub shaft also has fixed to it a spur gear 115, Figs. 5 and 8, adapted to mesh with and be driven by a spur gear 116. This gear 116 also has meshed engagement with a gear 117, the latter being fixed on the end of a shaft 118 journaled in the frame 57 and extending horizontally and angularly under the cone 55, as best shown in Fig. 8. The other end of the shaft 118 carries a bevel gear 119 meshing with a bevel gear 120 carried on one end of a shaft 121. The other end of the shaft 121 carries a spur gear 122 which meshes with and is adapted to be driven from a spur gear 123 carried on the end of an adjustment shaft 124, which shaft extends through the frame 57 and the face plate 70 and carries on its end a manual adjustment knob 125, similar in structure to the knob 104 previously described. It will be seen that by reason of the connections provided, as the shaft 124 is rotated by means of the manual adjustment knob 125, rotation will be imparted to the nut gear 112 by means of the gearing connection between the parts. A spring friction disc 126, Fig. 8, is provided for frictionally holding the shaft 124 in adjusted position, in a manner similar to the friction disc 106 previously described.

The gearing connections between the adjustment knob 104 and the sleeve 85 are such that one complete rotation of the knob 104 effects a movement of the tenths of cents gear 81 a distance corresponding to ten of the coaxial rows of teeth 75 provided on the cone. The gear ratios between the manual adjustment knob 125 and the sleeve 111 are such as to cause the shifting of the cents gear 110 a distance of only one row of teeth on the cone, for each complete revolution of the adjustment knob. As indicated in Fig. 1, each of the adjustment knobs 104 and 125 carries an index arrow adapted to cooperate with an index arrow on a dial portion 70a of the casing face plate 70. By bringing the fixed and rotatable index arrows into alignment, the operator has a ready means for ascertaining when a complete revolution has been imparted to the index knobs. The cents gear 110 is adapted for engagement with each of the forty-seven rows of teeth upon the cone 55, and it will be seen that this gear is brought successively into alignment with the rows of cone teeth, as whole revolutions are imparted to the adjustment knob 125. The tenths of cents gear 81 is adapted for cooperation with the bottom row of teeth upon the cone, and with each tenth row thereabove, comprising ten rows of engagement in all. The index arrows associated with the adjustment knob 104 will be brought into alignment at each of the ten operating stations or positions for the gear 81. A door 128, associated with the main housing 10, and shown in open position in Figs. 1 and 2, normally overlies the adjustment knobs 104 and 125 and the lever handle 66a whereby to house and conceal these parts when not exposed for adjustment.

Figure 9:
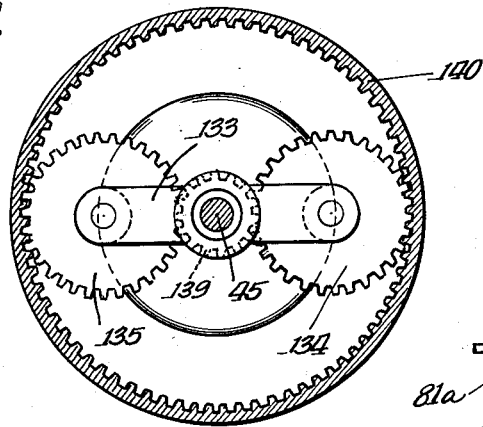
Fig. 9 is a sectional view through the differential mechanism forming a part of the structure, on a further enlarged scale, and taken as indicated by the line 9—9 of Fig. 5.
Figure 10:
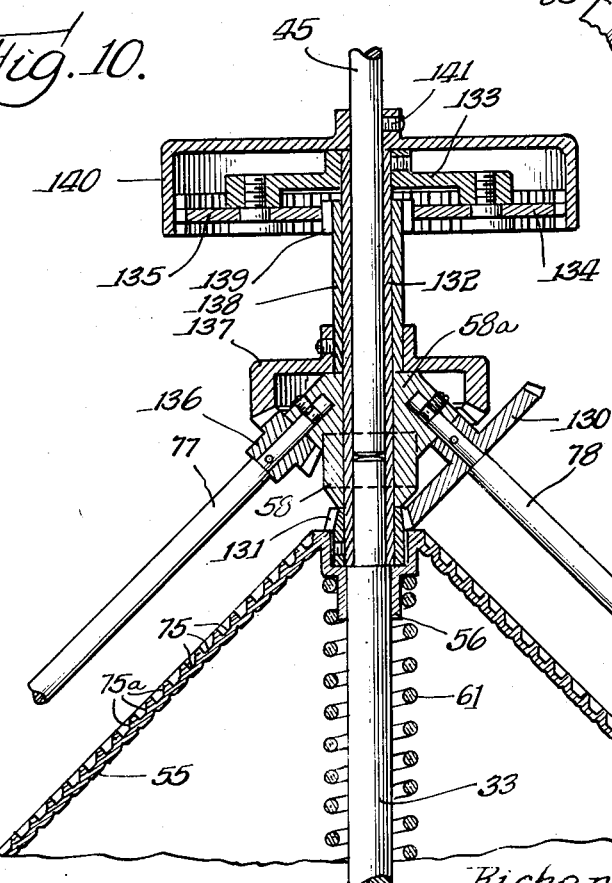
Fig. 10 is a vertical sectional view through the differential and associated structures, on the scale of Fig. 9, and taken as indicated by the broken line 10—10 of Fig. 8.

The means by which the rotational movements of the shafts 77 and 78 are combined to effect the operation of the cost register drive shaft 45 are best shown in Figs. 9 and 10. Shaft 78 has pinned to its upper end a bevel gear 130 adapted for meshing engagement with a bevel gear 131 fixed to the lower end of a sleeve 132 journaled upon the cost register drive shaft 45. The upper end of this sleeve carries a spider 133 upon which a pair of planet gears 134 and 135 are rotatably mounted. Shaft 77 has pinned to its upper end a bevel gear 136 adapted for meshing engagement with a crown bevel gear 137 fixed to the lower end of a sleeve 138 journaled upon the sleeve 132. The upper end of this sleeve 133 carries gear teeth 139 arranged for meshing engagement with the planet gears 134 and 135. A crown or ring gear 140 also has meshing engagement with the planet gears 134 and 135, this ring gear being fixed to the cost register drive shaft 45 by suitable means, such as set screw 141.

It will be seen that the planet gears 134 and 135, the gear 139, and the ring gear 140 constitute a planetary differential for combining the rotational movements of the gears 131 and 137, and transmitting the combined rotation to the output shaft 45 of the differential mechanism. It will further be seen that the rotational movements imparted by the shafts 77 and 78 to the differential mechanism are subtractive rather than additive, the rotational movements imparted by the shaft 77 being subtracted from those imparted by the shaft 78, for any given direction of rotation of the drive cone 55. The gear ratios of the differential, and of the drive gears 130, 131 and 136, 137, are so arranged that a given rotation of the cents shaft 78 produces fifty times the rotational effect upon the output drive shaft 45 as a rotation of the tenths of cents shaft 77. Accordingly, if the cents gear 110 is in engagement with the lowermost row of teeth upon the cone, tending to calculate gasoline at a price of 50 cents per gallon, and the tenths of cents gear 81 is also in engagement with the lowermost row of teeth on the cone, a value of $^{10}/_{10}$ or 1 cent will be subtracted, so that the calculation will actually be effected at 49 cents per gallon. If the gear 81 is raised upwardly ten rows of teeth, $\frac{1}{10}$ of a cent will be subtracted from the 50 cent calculation, so that the gasoline will be calculated at a unit cost price of 49.1 cents per gallon. The indicators, later to be described, which are associated with the unit price adjustment mechanism, are calibrated in accordance with this arrangement. By arranging the gears in subtractive relation, both driven gears 81 and 110 are always in engagement with the driving cone during operation of the apparatus, and being rotated thereby. Cost calculations may be made, in the embodiment illustrated, from 3 to 49.9 cents per gallon in increments of $\frac{1}{10}$ of a cent.

Unit price indicators of improved construction and arrangement are arranged for actuation by the price adjustment knobs 104 and 125, in accordance with the setting thereof. As best shown in Figs. 8 and 17, the adjustment shaft 103 has pinned thereto a bevel gear 145 adapted to drive a bevel gear 146 at the lower end of a vertical indicator actuator shaft 147. Near its upper end, shaft 147 is provided with a gear 148 meshing with and adapted to drive a gear 149, Figs. 17, 18 and 20, mounted upon one end, and adapted to drive a horizontal indicator shaft 150. Shaft 150 at its opposite end carries a rotatable drum tenths of cents indicator 151, the arrangement being such that as the tenths of cents adjustment knob 104 is actuated each complete revolution, a step of movement will be imparted, by means of the gearing connections described, to the indicator 151. As best shown in Figs. 18, 20 and 21, shaft 150 is also provided with a detent disc 152 adapted for cooperation with a spring detent 153, for accurately aligning the indicator in its various steps of movement.

Vertical shaft 147 also extends upwardly through the gear 148 and at its upper end carries a bevel gear 155, Figs. 17 and 18, adapted to mesh with the bevel gear 156, fixed to one end of a shaft 157 extending horizontally and diagonally across the computer frame. The opposite end of shaft 157 carries a bevel gear 158 adapted to mesh with a bevel gear 159, Figs. 18 and 19, mounted upon a vertical shaft 160. This vertical shaft carries a gear 161 adapted to operate a gear 162 fixed upon and arranged to drive a horizontal indicator shaft 163 upon which a tenths of cents drum indicator 164 is mounted, corresponding to the indicator 151 previously described. It will be seen that as indicator 151 is operated, indicator 164 at the opposite side of the computer is correspondingly actuated. A positioning detent mechanism, similar to that shown in Fig. 21, is also preferably provided for the indicator 164, as shown. Due to the arrangement of the cents indicator, presently to be described, the indicator drum 151 and its associated window 166 is slightly lower than the indicator drum 164 and its associated window 166a.

The cents indicator is in the form of a continuous tape 170, Figs. 18, 19 and 20, adapted to engage around a pair of sprocket drums 171 and 172, arranged for operation on vertical axes at opposite sides of the computer housing, as shown. The tape is provided with spaced perforations 173 along its edges, and the drums 171 and 172 are provided with projections 174 cooperable therewith, to insure proper engagement. The vertical shaft 175, upon which the drum 172 is mounted, is provided with a gear 176, Fig. 19, adapted to mesh with and be driven by a gear 177 carried at the upper end of a shaft 178, the lower end of which carries a bevel gear 179, Fig. 8, adapted to mesh with a bevel gear 180 on the cents indicator adjustment shaft 124. It will be seen that as the indicator shaft 124 is adjusted, corresponding increments of movement will be imparted to the indicator tape 170, by means of the gearing connections described. A pair of engagement pins 183 and 184, Fig. 18, are carried on the ends of arms 185 and 186, which arms are independently pivoted upon the frame, as indicated at 187. A tension spring 188 urges the arms relatively toward each other, whereby to urge the pins 183 and 184 into engagement with the indicator tape and maintain it under proper tension. As best shown in Fig. 19, the tape is provided with two sets of indications 190 and 191, for cooperation respectively with the windows 166 and 166a. A detent positioning device, as indicated at 152b in Fig. 20, similar to the mechanism illustrated in Fig. 21, is associated with the vertical indicator drum shaft 175, for maintaining the tape in proper alignment at its various operative positions.

In operation, to effect a price adjustment, the lever 66a is first depressed, whereby to depress the cone 55, disengaging the gears 81 and 110 therefrom. The adjustment knobs 104 and 125 may thereupon be readily manipulated, the operator watching the unit price indicators as the adjustments are made, whereby to effect the repositioning of the gears 81 and 110 longitudinally of the shafts 77 and 78 to the proper preselected price per gallon. The lever 66a may thereupon be raised, and upon rotation of the cone, proper intermeshing engagement with the gears 81 and 110 will automatically be established. As the cone is rotatably driven by the drive shaft 33, the cents and tenths of cents computations will be made as previously described, the proper combined output being transmitted to the cost register drive shaft 45.

The disposition of the shafts 77 and 78 at an angle of 45°, parallel to the operating working surface of the cone, in combination with the adjustment means provided for positioning the gears 81 and 110, produces a compact improved operating structure. By means of the two drive shafts 77 and 78, computations may be made over a wide preselected price range, as heretofore described. Price adjustments may be effected by ready manipulation of the knobs 104 and 125, and the associated horizontal axis drum indicator and vertical axis tape indicator cooperate with the adjustment means to provide a simplified and improved indicator structure.

Figure 11:
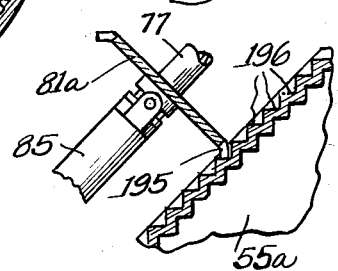
Figs. 11 and 12 illustrate modified forms of cone members.
Figure 12:
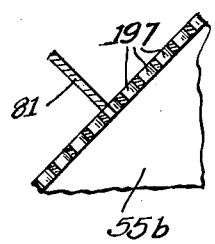

It is contemplated that the cone 55 may comprise a simple sheet metal stamping. Alternatively, it is contemplated that it may be formed by molding a suitable plastic material, and of course it may comprise a metal casting. To facilitate the close spacing of the coaxial rows of teeth, it will be seen that the depressions are provided with cut away vertically disposed surfaces 75a, whereby to facilitate the close spacing of the rows of teeth while still permitting the cone to be vertically depressed to disengage from the gears 81 and 110. In Fig. 11 a modified embodiment is illustrated, wherein the periphery of the driven gear is angularly bent as shown at 195, to facilitate close spacing of the coaxial rows of cone teeth or indentations 196. In Fig. 12 an embodiment is illustrated, wherein simple perforations, as indicated at 197, are provided in the cone member. It will thus be seen that the sheet metal cone teeth may be variously formed.

In Fig. 7 an embodiment is illustrated wherein an interlock is provided between the adjustment knobs 104a and 125a, corresponding to the adjustment knobs 104 and 125 previously described, and the cone depressing lever. In this instance it will be seen that the cone depressing lever, as indicated at 66b, and corresponding in function and purpose to the cone depressing lever previously described, is provided with a pair of arms 200 and 201 adapted to engage within slots formed in the adjustment knobs 104a and 125a when the depressing lever is raised and if the adjustment knobs are in proper rotational position. In the arrangement thus provided, it will be seen that the lever 66b cannot be raised to permit the cone to engage the cone driven gears unless and until the adjustment knobs are in proper position to effect the alignment of the driven gears with the cone teeth.

It is obvious that various changes may be made in the specific embodiments set forth for purposes of illustration without departing from the spirit of the invention. The invention is accordingly not to be limited to the precise embodiments shown and described, but only as indicated in the following claims.

The invention is hereby claimed as follows:

1. A computing mechanism comprising a first operating member, a cone gearing structure in driving relation with said operating member, said cone gearing having a plurality of different size rows of coaxial gear teeth, a plurality of shafts disposed in operative juxtaposition to the cone gearing at an acute angle in respect to the axis of said cone gearing, each of said shafts having a gear connected in driving relation therewith and adapted to operatively engage the cone gearing, means for shifting the cone gearing axially to effect disengagement between the cone gearing and said gears, differential mechanism connected in driving relation to said shafts, and a second operating member connected in driving relation to the differential mechanism.

2. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear connected in driving relation therewith and adapted to operatively engage the gearing structure, means for shifting the gearing structure and shafts relatively to each other in a direction extending axially of the gearing structure to effect operative disengagement between said gearing structure and said gears, elongated means mounted on each of said shafts and movable axially of the shafts for shifting said gears axially of their respective shafts, differential mechanism connected in driving relation with said shafts, and a second operating member connected in driving relation to the differential mechanism.

3. A computing mechanism as defined in claim 2, wherein said elongated means comprise a nonrotatable screw threaded sleeve mounted on and extending axially of said shafts.

4. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear thereon adapted to engage the gearing structure for operative driving relation therewith, means comprising a plurality of handle members rotatable upon fixed axes for shifting said gears axially of their respective shafts, means for shifting the gears and said gearing structure relatively to each other in a direction extending axially of the gearing structure to disengage the gears therefrom, differential mechanism connected in driving relation with said shafts, and a second operating member connected in driving relation to the differential mechanism.

5. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts being parallel to the working surface of the gearing structure and having a gear connected in driving relation therewith adapted to operatively engage the gearing structure, means comprising a plurality of handle members rotatable upon parallel fixed axes for shifting said gears axially of their respective shafts, differential mechanism connected in driving relation with said shafts, and a second operating member connected in driving relation to the differential mechanism.

6. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear operatively connected therewith adapted to operatively engage the gearing structure, means for shifting the gearing structure and shafts relatively to each other in a direction extending axially of the gearing structure to effect disengagement between said gearing structure and said gears, means comprising a plurality of handle members rotatable upon fixed axes for shifting said gears axially of their respective shafts, differential mechanism connected in driving relation with said shafts, and a second operating member connected in driving relation to the differential mechanism.

7. A computing mechanism as defined in claim 6, wherein interlock means is provided between the handle members and the means for shifting the shafts and gearing structure relatively axially of the gearing structure, whereby said latter means may not be operated in one direction except when said handle members are in predetermined positions.

8. A computing mechanism as defined in claim 4, wherein said plurality of shafts are two in number, one of said shafts being a cents shaft the gear of which is engageable with consecutive rows of teeth of the gearing structure, and the other of said shafts being a tenths of cents shaft the gear of which is engageable with spaced rows of teeth of the gearing structure.

9. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts being parallel with the operating surface of the gearing structure and having a gear connected therewith adapted to operatively engage the gearing structure, means comprising a plurality of handle members for shifting said gears axially of their respective shafts, rotatable indicator means connected to each handle member for indicating the position thereof, differential mechanism connected in driving relation with said shafts, and a second operating member connected in driving relation to the differential mechanism.

10. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear connected therewith adapted to operatively engage the gearing structure, means for shifting the gearing structure and shafts relatively to each other in a direction extending axially of the gearing structure to effect disengagement between said gearing structure and said gears, means comprising a plurality of handle members for shifting said gears axially of their respective shafts, rotatable indicator means for indicating the position of said handle members, differential mechanism connected in driving relation with said shafts, and a second operating member connected in driving relation to the differential mechanism.

11. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear connected therewith and adapted to operatively engage the gearing structure, means comprising a plurality of rotatable handle members operable on fixed axes for shifting said gears axially of their respective shafts, each of said handle members being rotatable the same amount to effect a unit shifting of the gear controlled thereby, differential mechanism connected in driving relation with said shafts in a speed ratio of at least ten to one, and a second operating member connected in driving relation with the differential mechanism.

12. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear connected therewith adapted to operatively engage the gearing structure, means comprising a plurality of handle members operable upon fixed axes for shifting said gears axially of their respective shafts, rotatable indicator members operable upon different axes disposed relatively angularly to each other for indicating the position of engagement between said gears and said gearing structure, differential mechanism connected in driving relation with said shafts, and a second operating member connected in driving relation with the differential mechanism.

13. A computing mechanism as defined in claim 12, wherein said rotatable indicator members are operable respectively within vertical and horizontal planes.

14. A computing mechanism comprising a first operating member, a gearing structure in driving relation with said operating member, said gearing structure having a plurality of different size rows of coaxial gear teeth, a plurality of shafts disposed in operative juxtaposition to the gearing structure, each of said shafts having a gear connected therewith adapted to operatively engage the gearing structure, means for shifting the gears axially of their respective shafts, indicating members comprising a tape member and rotatable drum indicator means for indicating the position of engagement between said gears and said gearing structure, differential mechanism connected in driving relation with said shafts in a speed ratio of at least ten to one, and a second operating member connected in driving relation with the differential mechanism.

15. A computing mechanism as defined in claim 14, wherein a plurality of window structures are provided in association with said indicators, said tape being extended into operative juxtaposition to said plurality of windows.

16. A computing mechanism as defined in claim 15, wherein said plurality of shafts are two in number, one of said shafts being a cents shaft, and the other of said shafts being a tenths of cents shaft.

17. A computing mechanism comprising a first operating member, a cone gearing structure in driving relation with said operating member, said cone gearing having a plurality of different size rows of coaxial gear teeth, a plurality of shafts disposed in operative juxtaposition to the cone gearing, each of said shafts being disposed in parallel relationship to the working surface of the cone gearing structure and having a gear connected therewith adapted to operatively engage the cone gearing structure, the teeth of said cone gearing and said gears being shaped to facilitate relative shifting of the gears and gearing relatively to each other in a direction extending axially of the gearing, means for shifting said gears axially of their respective shafts, planetary differential mechanism connected in driving relation with said shafts, and a second operating member connected in driving relation with the differential mechanism.

RICHARD R. TREXLER.

REFERENCES CITED

The following references are of record in the file of this patent:

UNITED STATES PATENTS

| Number | Name | Date |
|---|---|---|
| 762,062 | Judd | June 7, 1904 |
| 890,870 | Reed | June 16, 1908 |
| 1,606,869 | Christopher | Nov. 16, 1926 |
| 1,662,688 | Veber | Mar. 13, 1928 |
| 1,967,559 | Schreck | July 24, 1934 |
| 2,111,996 | Slye | Mar. 22, 1938 |
| 2,145,843 | Maxson | Jan. 31, 1939 |

FOREIGN PATENTS

| Number | Country | Date |
|---|---|---|
| 16,792 | Great Britain | July 25, 1906 |
| 149,458 | Austria | Dec. 15, 1936 |
| 842,413 | France | June 12, 1939 |